INVENTORS
D.L. KRAFT
E.C. BEASON, JR.
BY Hudson and Young
ATTORNEYS

April 2, 1963 D. L. KRAFT ETAL 3,083,757
KNIFE SEALER FOR THERMOPLASTIC FILM OR SHEET
Filed Nov. 15, 1960 2 Sheets-Sheet 2
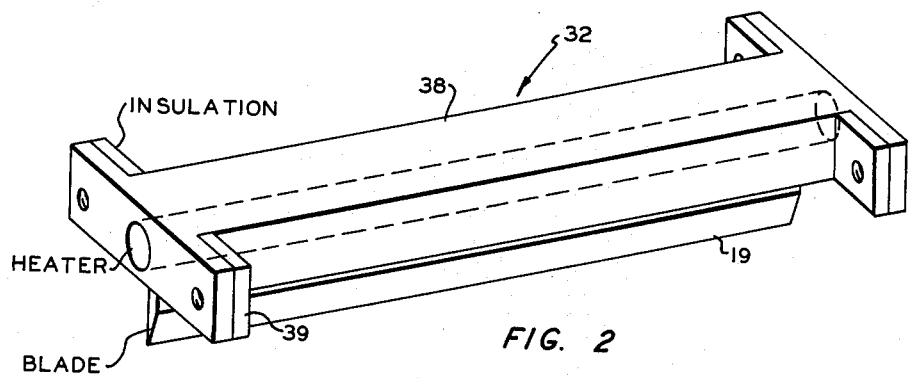
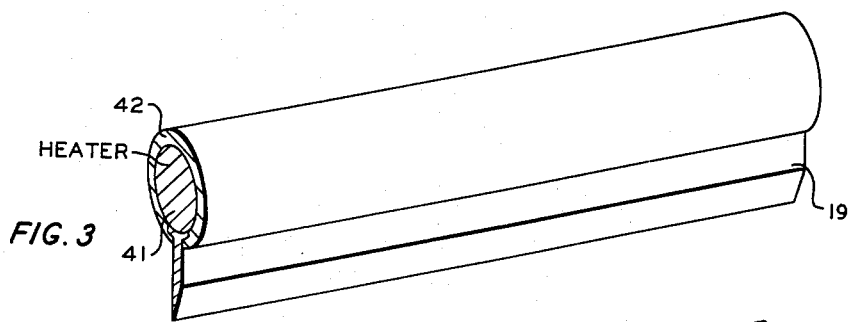
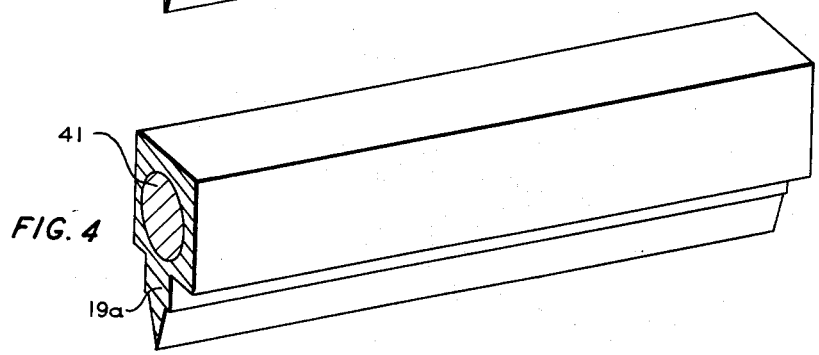
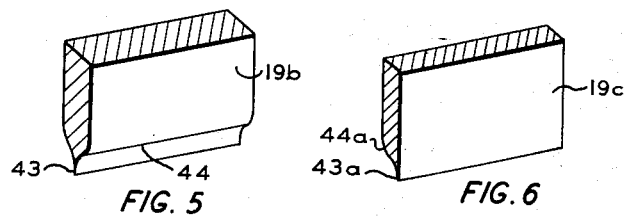
INVENTORS
D. L. KRAFT
E. C. BEASON, JR
BY Hudson and Young
ATTORNEYS United States Patent Office 3,083,757
Patented Apr. 2, 1963

3,083,757
KNIFE SEALER FOR THERMOPLASTIC
FILM OR SHEET
Donald L. Kraft and Elmer C. Beason, Jr., Bartlesville, Okla., assignors to Phillips Petroleum Company, a corporation of Delaware
Filed Nov. 15, 1960, Ser. No. 69,397
8 Claims. (Cl. 156—515)

This invention relates to the simultaneous cutting and sealing of a plurality of layers of thermoplastic films or sheets. In one aspect this invention relates to a device for the simultaneous cutting and sealing of a plurality of thermoplastic films or sheets to produce bags and other formed articles.

Various heat sealing devices have been proposed for the fabrication of articles such as bags from thermoplastic films; however, such devices have not successfully accomplished the fabrication of thermoplastic bags at high rates of speed and have not provided a satisfactory combined cutting and sealing operation. When a plurality of layers of thermoplastic film is simultaneously cut and sealed, the resulting seal has not been entirely satisfactory.

It is therefore a principal object of this invention to provide a means for the simultaneous cutting and sealing of a plurality of layers of thermoplastic films or sheets. It is also an object of this invention to provide a means for the simultaneous cutting and sealing of a plurality of layers of thermoplastic films and sheets at high rates of speed for the continuous production of large quantities of formed articles such as bags. Still another object of this invention is to provide a means for the continuous simultaneous cutting and sealing of a plurality of layers of thermoplastic films or sheets whereby the cutting is accomplished by shearing rather than melting the thermoplastic material and the seal is formed by a sliding contact of the knife blade with the layers of thermoplastic material. Still another object of this invention is to provide a means for heat sealing a plurality of layers of thermoplastic film or sheet wherein pressure is applied to the plurality of layers during the sliding contact sealing of the plurality of layers. Other and further objects and advantages of the invention will be apparent to one skilled in the art upon studying this disclosure including the detailed description of the invention and drawing wherein:

FIGURE 2 is a perspective view of a cutter blade assembly;

FIGURE 3 is a perspective view of a heater and a cutter blade for making a single seal;

FIGURE 4 is a perspective view of another form of heater and a cutter blade for making a single seal;

FIGURE 5 is a perspective view of a preferred modification of cutter blade for making a double seal; and FIGURE 6 is a perspective view of a preferred modification of cutter blade for making a single seal.

Figure 1:
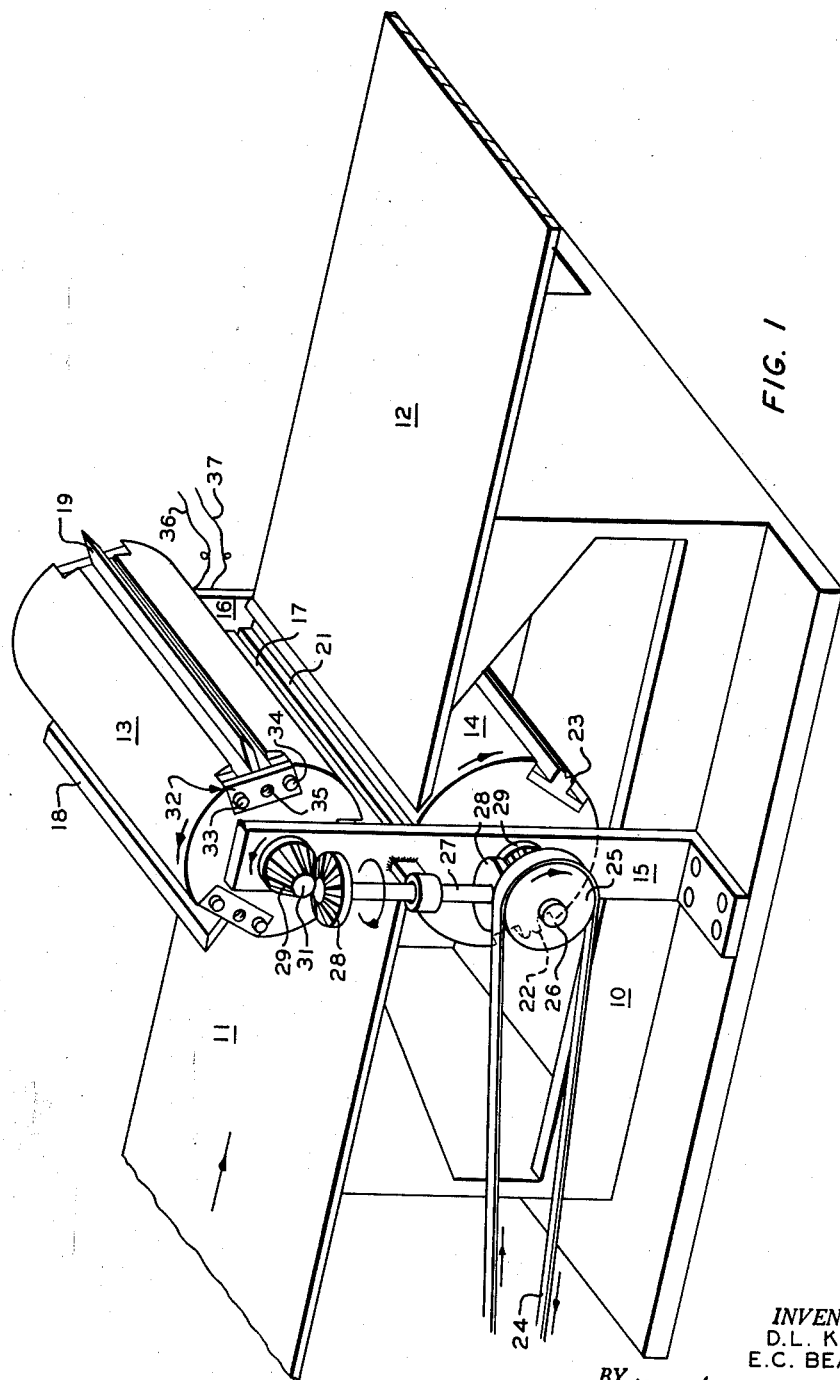
FIGURE 1 is a perspective view of the device of the invention.

Referring now to the drawing, and particularly to FIGURE 1, the frame 10 supports table sections 11 and 12 and also the cutter blade drum 13 and the shear bar drum 14. These drums are rotatably secured to the vertical supports 15 and 16 so that as the drums are rotated the cutter bars 17, 18 and 19 coincide with the shear bars 21, 22 and 23. The drums are rotated by a power source (not shown) which operates the belt 24 so as to rotate the pulley 25 attached to shaft 26 which forms the axis of drum 14. Drum 13 is caused to rotate by shaft 27 having bevel gear 28 secured to each end thereof. A bevel gear 29 secured to shaft 31 meshes with the bevel gear 28. Shaft 31 forms the axis of drum 13. A bevel gear identical to 29 is secured to shaft 26 and meshes with the bevel gear at the lower end of shaft 27, which bevel gear is identical to 28. Thus, drum 14 is caused to rotate clockwise and drum 13 is caused to rotate counter-clockwise at identical rates so that the cutter blades of drum 13 coincide with the shear bars of drum 14 so as simultaneously to shear and seal a plurality of layers of thermoplastic film or sheet passing over the table sections 11 and 12 and between the drums 13 and 14.

The cutter blades are supported in an assembly indicated at 32 which is secured in a recessed portion of drum 13 by means of bolts 33 and 34. A heater element (not shown) is positioned in a passageway 35 in the cutter blade assembly 32. Electrical current is supplied to the heater elements by means of electrical wires 36 and 37 and sliding contacts on drum 13 (not shown).

The cutter blade assembly 32 is shown in detail in FIGURE 2. A supporting frame 38 is adapted to have secured thereto a cutter blade such as blade 19. Passageway 35, shown in FIGURE 1, in frame 38 accommodates a heater in heating contact with blade 19. The cutter blade assembly is insulated from drum 13 by insulation 39.

FIGURE 3 shows one method for positioning the cutter blade indicated as 19 in heating contact with the heater 41. The heater 41 is insulated from the frame 38 by insulating sleeve 42.

FIGURE 4 illustrates a modification of the blade and heater assembly wherein the blade indicated at 19a is made of nonconducting material such as quartz.

FIGURE 5 illustrates a preferred form of blade 19b whereby a plurality of layers of thermoplastic film or sheet is simultaneously cut and sealed with the layers on each side of the blade being sealed. This form of blade provides a sliding sealing contact with an optimum amount of pressure being applied to the layers being sealed after they are severed by the blade tip 43. The shoulder portion 44 of the blade provides the sliding contact with pressure being applied.

FIGURE 6 shows a preferred blade form for the simultaneous cutting and sealing of a plurality of thermoplastic films or sheets wherein a seal is made on only one side of the blade with the sliding contact and pressure being applied by the shoulder 44a of blade 19c after the layers have been sheared by the blade tip 43a.

The configuration of the cutter blade or knife is important in accomplishing a clean cut of the thermoplastic material and a satisfactory sealing of the layers. The knife edge or tip of the blade should be sharp and fairly thin. The blade should then increase sharply in thickness to effect a sliding seal of the layers of material with application of pressure upon the layers of material. A triangular or wedge-shaped blade, with respect to the cross-section, will produce a satisfactory shearing and sealing of the material. The addition of shoulders on the side of the blade will provide an increased area for application of pressure upon the layers and will increase the area of the seal.

A particularly effective configuration for the cutter blade is that of the two parallel sides of a cross-section of the blade gradually converging into a form approximating that of a semicubical parabola. This configuration also resembles a punctuation brace having an elongated nib. This blade is illustrated in FIGURE 5. Such blade will shear the layers of film or sheet and will effect a seal on each side of the blade. If it is desired to sever the layers of material and effect a seal on only one side of the blade, the blade will have one side vertical or normal to the plane of the layers of material. Thus, the configuration shown in FIGURE 6 is an especially preferred form and a cross section of the blade can be described as two parallel lines one of which converges into the other in the approximate form of a normal distribution curve wherein the x axis is represented by the straight side of the blade.

If it is desired to utilize a blade having a wedge-shaped or triangular form, in cross section, to sever a plurality of layers of thermoplastic film or sheet and to effect a seal on only one side of the blade, one side of the blade will be normal to the plane of the layers of material. Thus, the configuration of the blade in cross-section will be that of a right triangle with the 90° angle being adjacent to or in the direction of the drum.

It is preferred to use materials for the cutter blades which have a low value of thermal conductivity because such materials do not tend to stick to the molten thermoplastic material. The cutter blade surface should also be as smooth as practical. The thermal conductivity value of the cutter blade should be at least as great as that of the thermoplastic material but should not be more than about 30 times as great. The following materials are indicative of those suitable for cutter blades:

|  | Cal./cm. |
|---|---|
| Hastelloy B | 0.0270 |
| Nilvar | 0.0270 |
| Nichrome V | 0.0330 |
| Inconel | 0.0363 |
| Stainless steel | 0.0310 to 0.0390 |
| Quartz | 0.0035 |

Normally solid polyethylene has a thermal conductivity value of about 0.0011 Cal./cm.

The shear bar can have a groove in its surface to coincide with the knife edge of the cutter blade and to aid in making a pressing, sliding contact seal of the material due to the rolling motion of the blade and bar at the point of contact.

The rotation of the drums and the configuration of the blades combine to cut the material by a shearing action and to effect a heat seal at the sheared edges by a sliding contact of the heated blade with pressure being applied during the sliding contact. The device is applicable to high speed production of formed articles such as bags and can be operated to cut and seal bags at a rate of about 100 to about 300 per minute.

A flattened tubular film can be passed through the device with cutter blades having one vertical side so that a seal is effected on only one side of the blade and bags with a sealed bottom and open top are produced. A flat film, folded once, can be passed through the device with cutter blades having a shoulder on each side, as shown in FIGURES 4 and 5, so that a seal is effected on each side of the blade and bags having a continuous bottom and sealed sides with an open top are produced. Straight cutter blades and shear bars have been illustrated and described but it will be obvious that other shapes can be utilized so long as the principles of cutting and sealing which have been set forth are followed.

Any of the thermoplastic films and sheets of commerce can be cut and sealed by the device of this invention. Such thermoplastic materials include polyethylene, polyvinyl chloride, various copolymers of ethylene and higher molecular weight olefins, and the like.

The work pieces, e.g., the layers of sheet or film, can be fed to the device by any known means such as by a pair of feed rolls. The tables 11 and 12 can be replaced by conveyor belts, particularly when thin film is being utilized so as to support the film being passed to and from the device.

Films and sheets of almost any thickness can be cut and sealed by the device. Thin film is usually considered to be film of less than 2 mils in thickness; thick film is usually from about 2 to 12 mils; and sheet is usually more than 12 mils in thickness.

The rate of rotation of the drums, and therefore the rate at which cutting and sealing can be accomplished, and knife temperature will be determined by the thickness of the film being processed and by the melting or softening temperature of the film. The knife temperature, in any case, will be far higher than the softening point of the film or sheet. Thus, for polyethylene which has a softening temperature of about 250 to 265° F., the blade temperature will be about 1000° F. for both thin and thick film and will be about 600 to about 800° F. for sheet. As the film or sheet thickness increases, the drum rotation rate and the blade temperature will be reduced.

That which is claimed is:

1. A knife sealer for simultaneously cutting and sealing together the cut edges of a plurality of layers of thermoplastic polymeric film and sheet which comprises a frame; a first drum rotatably mounted on said frame; a second drum rotatably mounted on said frame and spaced from said first drum with its longitudinal axis parallel to the longitudinal axis of said first drum; a plurality of cutter blades secured to the periphery of said second drum and extending radially from the periphery of said drum substantially parallel to the longitudinal axis of said drum, each cutter blade having a thin, sharp cutting edge diverging sharply into a thick blade body, and each cutter blade having a thermal conductivity value of about 1 to about 30 times that of the thermoplastic material; a plurality of shear bars, equal in number and spacing to said cutter blades, secured to the periphery of said first drum and extending from the periphery of said first drum so as to coincide with said cutter blades in cutting contact as said drums are rotated; means to maintain said cutter blades at a temperature at least about twice that of the softening point of the thermoplastic material; means to rotate said first drum; and means to rotate said second drum in synchronous opposition to said first drum so that said blades and said cutter bars coincide.

2. The knife sealer of claim 1 wherein a cross-section of said cutter blade approximates an isosceles triangle having its base toward said drum.

3. The knife sealer of claim 1 wherein a cross-section of said cutter blade approximates a right triangle with the 45° angle adjacent the drum.

4. The knife sealer of claim 1 wherein a cross-section of said cutter blade approximates two parallel lines converging into a semicubical parabola.

5. The knife sealer of claim 1 wherein a cross-section of said cutter blade approximates two parallel lines with one converging into the other in the form of a normal distribution curve.

6. Apparatus for simultaneously cutting and sealing together the cut edges of a plurality of layers of a thermoplastic material which comprises a cutter blade having a knife edge projecting beyond a shoulder formed by a thicker portion of said blade; means to maintain said cutter blade at a temperature above that of the softening point of the thermoplastic material; means to rotate said blade around an axis parallel to the longitudinal axis of the blade with the knife edge defining the periphery of a resulting circle; a shear bar having a longitudinal groove in its surface to coincide with the knife edge of said cutter blade in shearing engagement and to secure the edges of the layers of sheared material in pressing and sliding engagement with the shoulder of said cutter blade; means to rotate said blade around an axis parallel to the longitudinal axis of the shear bar with said groove defining the periphery of a resulting circle so that said cutter blade and said shear bar coincide at the intersection of the two circles.

7. The apparatus of claim 6 wherein the cutter blade has a thermal conductivity value of about 1 to about 30 times that of said thermoplastic material.

8. The apparatus of claim 6 wherein means are provided to pass a plurality of layers of thermoplastic material to and to remove cut and sealed articles from said apparatus.

References Cited in the file of this patent

UNITED STATES PATENTS

| | | |
|---|---|---|
| 1,644,122 | Griffiths | Oct. 4, 1927 |
| 1,834,078 | Stein | Dec. 1, 1931 |
| 1,972,133 | Darrow | Sept. 4, 1934 |
| 2,627,893 | Williams | Feb. 10, 1953 |
| 2,638,963 | Frederick | May 19, 1953 |
| 2,686,556 | Gerber | Aug. 17, 1954 |
| 2,707,985 | Binnall | May 10, 1955 |
| 2,711,779 | Carland | June 28, 1955 |
| 2,732,881 | Anderle | Jan. 31, 1956 |
| 2,770,936 | Clark | Nov. 20, 1956 |
| 2,805,700 | Klasing | Sept. 10, 1957 |
| 2,824,596 | Crawford | Feb. 25, 1958 |